Patented Jan. 26, 1937

2,069,095

UNITED STATES PATENT OFFICE 2,069,095

A HYDROXY MERCURI HALO-FLUORAN

Edward Lyons, Detroit, Mich., assignor to Parke, Davis & Company, Detroit, Mich., a corporation of Michigan No Drawing. Application July 29, 1931, Serial No. 553,888

4 Claims. (Cl. 260—13)

The invention relates to germicides and more particularly to mercury compounds of halogenated fluorans.

I have discovered a new compound having exceptional germicidal properties and I have also invented a therapeutic agent utilizing the new compound together with an additional agent for obtaining germicidal effects.

The new composition which I have discovered is a mercuration product of an organic dye known as Rose Bengal —SA "Colour Index" 777 and may be designated as disodium mono-hydroxy mercuri 2,4,5,7 tetraiodo 12,15 dichloro 3,6-dihydroxy fluoran and bears the following formula:

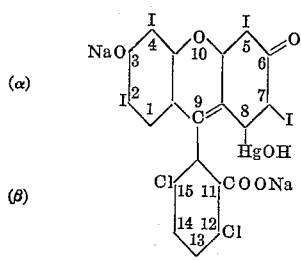

The following method may be used for preparing the new composition.

The dye Rose Bengal —SA which may be designated as the "2,4,5,7 tetraiodo 12,15 dichloro 3,6-dihydroxy fluoran" is normally obtained commercially in the form of the sodium or potassium salt. This dye is commonly designated as the sodium or potassium salt of tetraiodo dichloro fluorescein. It may also be designated as alpha tetraiodo beta dichloro 3,6-dihydroxy fluoran. An explanation of this nomenclature will be found in the United States patent to White No. 1,860,003, page 1, lines 13 to 29. From this dye the acid substance is obtained by precipitation with acetic acid, washing the precipitate with water and drying. 45 g. (1 equivalent) of the acid substance thus obtained is suspended in 1000 cc. of water and 15.9 g. (1 equivalent) of mercuric acetate or other equivalent mercuric salt in 100 cc. of water is added. The mixture is heated till a test no longer shows inorganic mercury to be present. The reaction mixture is then treated with a slight excess of dilute sodium hydroxide or other equivalent alkali, centrifuged, and the clear liquid thus obtained is then treated with an excess of acetic acid. The precipitate is washed thoroughly with water, alcohol and ether. This precipitate is the acid form of my new germicidal composition and has the following probable formula

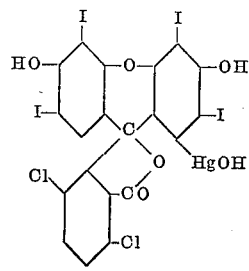

It is dissolved in just enough alkali to give a slightly alkaline reaction and the solution is carefully evaporated to dryness. The yield is about 55 g. and has a mercury content of about 17%, and corresponds to the formula $$C_{20}H_3O_5Cl_2I_4Na_2(HgOH)$$

The above compound is soluble in water and yields a solution having a red color. The material has excellent germicidal properties. The coefficient of this compound against typhosus according to the H. L. method is 250 while the coefficient against staphaureus is 18. Thus the germicidal properties of this new compound are far superior to the germicidal properties of many well known solutions in extensive public use.

While the above compound in water solution is an excellent germicide, I have prepared another therapeutic agent which is even better than the above since it has in addition to the high coefficient against typhosus a greater coefficient against staphaureus. This new therapeutic agent is prepared by combining the disodium mono-hydroxy mercuri 2,4,5,7 tetraiodo 12,15 dichloro 3,6-hydroxy fluoran with another mercury derivative of an organic dye which may be designated as disodium mono-hydroxy mercuri 2,4,5,7 tetraiodo 12,13,14,15 tetrachloro 3,6-dihydroxy fluoran. This latter compound is prepared by mercuration of a dyestuff of the eosine series known as Rose Bengal 3 B (M) "Colour Index" 779. The mercuration process is carried out in the same manner as indicated above in connection with the first mentioned mercurated dye. The compound thus obtained is water soluble, of alkaline reaction, and bears the probable following formula:

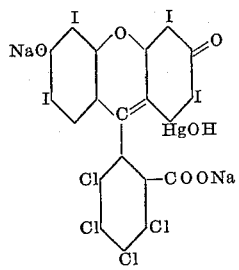

The compound has germicidal properties but the coefficient against typhosus is only 30 to 100 in contradistinction to the coefficient of the first compound of 250. On the other hand, the coefficient against staphaureus is 250, whereas the corresponding coefficient of the first compound is only 18.

I have found that by mixing the two compounds a therapeutic agent is obtained which has a high coefficient against both typhosus and staphaureus, thus making an ideal germicidal solution. The two materials may be mixed in any desired proportions but I have found that substantially equal parts by weight gives a desirable material with high coefficients against both typhosus and staphaureus.

The new therapeutic agent may be marketed either as a mixture of the solid compounds or as a water solution of both compounds. In either form the therapeutic agent is far superior to the germicidal agents now in extensive public use.

While I have indicated in the two formulas given above that the compounds are sodium salts, it is to be understood that equivalent compounds can be made with the other alkali metals such, for example, as potassium.

What I claim as my invention is:

1. An alkali metal salt of mono-hydroxy mercuri 2,4,5,7 tetraiodo 12,15 dichloro 3,6-dihydroxy fluoran, said compound being water soluble forming a red solution having germicidal properties.

2. The water soluble compound having the following formula:

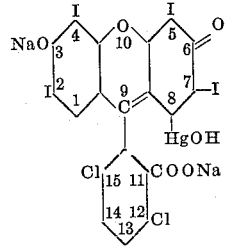

3. An alkali metal salt of mono-hydroxy mercuri tetraiodo dichloro fluorescein having a formula corresponding to $$C_{20}H_3O_5Cl_2I_4M_2(HgOH)$$

where M is an alkali metal.

4. A compound having the formula $$C_{20}H_3O_5Cl_2I_4M_2(HgOH)$$

where M is hydrogen or an alkali-metal.

EDWARD LYONS.